US008241810B2

(12) United States Patent
Frank et al.

(10) Patent No.: US 8,241,810 B2
(45) Date of Patent: Aug. 14, 2012

(54) RACKED POWER SUPPLY VENTILATION

(75) Inventors: David George Frank, Scarborough (CA); Vicente Nunes, Mississauga, CA (US); Claus Andersen, Kolding (DK); Jacob Schmidt, Kolding (DK)

(73) Assignees: Hydrogenics Corporation, Mississauga (CA); American Power Conversion Corporation, West Kingston, RI (US)

( * ) Notice: Subject to any disclaimer, the term of this patent is extended or adjusted under 35 U.S.C. 154(b) by 886 days.

(21) Appl. No.: 12/256,058

(22) Filed: Oct. 22, 2008

(65) Prior Publication Data

US 2009/0186245 A1 Jul. 23, 2009

Related U.S. Application Data

(60) Provisional application No. 60/981,683, filed on Oct. 22, 2007.

(51) Int. Cl.
*H01M 8/24* (2006.01)
*H01M 2/12* (2006.01)
*H01M 8/04* (2006.01)
*H01M 2/20* (2006.01)

(52) U.S. Cl. .......... 429/452; 429/71; 429/436; 429/433; 429/443; 429/469

(58) Field of Classification Search .................. 429/433, 429/434, 436, 439, 469, 452, 508, 512, 513, 429/71, 443

See application file for complete search history.

(56) References Cited

U.S. PATENT DOCUMENTS

| 6,387,556 | B1 * | 5/2002 | Fuglevand et al. ............ 429/429 |
| 6,455,183 | B1 | 9/2002 | Reiser et al. |
| 6,544,679 | B1 * | 4/2003 | Petillo et al. .................. 429/505 |
| 6,783,882 | B2 * | 8/2004 | Schmidt ......................... 429/410 |
| 7,326,480 | B2 * | 2/2008 | Fuglevand ......................... 429/9 |
| 2003/0157384 | A1 | 8/2003 | Kondo |
| 2005/0147855 | A1 * | 7/2005 | Reiser et al. .................... 429/13 |

FOREIGN PATENT DOCUMENTS

| CA | 2617356 A1 | 12/2000 |
| CA | 2435763 A1 | 7/2002 |
| CA | 2578835 A1 | 8/2006 |
| CA | 2578853 A1 | 8/2008 |
| WO | 2006020572 A2 | 2/2006 |
| WO | 2009052620 A1 | 4/2009 |

OTHER PUBLICATIONS

Written Opinion issued Feb. 6, 2009 in respect of corresponding International Application No. PCT/CA2008/001869.

* cited by examiner

*Primary Examiner* — Patrick Ryan
*Assistant Examiner* — Julian Anthony

(57) ABSTRACT

A system includes power modules received within a frame of a ventilation enclosure. Each of the power modules has a fuel cell stack. A ventilation shaft is arranged along a rear side of the ventilation enclosure and sealingly receives the power modules so that exhaust outlets of the power modules discharge into the ventilation shaft. Each of the power modules is removably attachable to the ventilation shaft through the front side of the ventilation enclosure. A fuel supply pipe in the ventilation shaft supplies fuel to fuel inlets of the power modules. An exhaust pump draws exhaust fluid out of the ventilation shaft.

18 Claims, 7 Drawing Sheets

RACKED POWER SUPPLY VENTILATION

FIELD

This invention relates to fuel cell power modules, and more particularly but not exclusively is related to fuel cell power modules located together in a common housing.

BACKGROUND

The following paragraphs are not an admission that anything discussed in them is prior art or part of the knowledge of persons skilled in the art.

Fuel cells provide a source of electrical power that can be used for a variety of different purposes. Fuel cells are commonly configured into stacks that generate useful voltages. Fuel cell stacks require a number of auxiliary components in order to function efficiently, e.g., conduits, valves, pumps, compressors and the like for delivering process gases; humidifiers for humidifying processed gases; control equipment. These additional components are commonly referred to as "balance of plant" or BOP.

To make a fuel cell stack readily useable for a variety of applications, fuel cell stacks are sometimes packaged with the associated balance of plants components to form a fuel cell power module. Such power modules can be integrated to the extent that they require no more than connections to necessary reactant supplies (e.g., hydrogen and air), and possibly a coolant (water, although sometimes air again is used as a coolant), and additionally electrical connections for the electricity generated by the fuel cell power module.

It has been proposed to use fuel cell power modules as backup power supplies. Such backup power supplies may be deployed at installations that require a high degree of integrity in their power supply and/or may be located in remote areas where a standard electricity power supply is not reliable. For example, remote transmitting towers for various functions often require backup power supplies.

In order to provide the necessary level of reliability, it is common to provide two or more power modules together. For example, sometimes three power modules are provided, with the intent that two would be sufficient to provide the necessary power and the third power module then acts as a further backup, in case one of the other two power modules fails.

INTRODUCTION

The following introduction is intended to introduce the reader to this specification but not to define any invention. One or more inventions may reside in a combination or subcombination of the apparatus elements or method steps described below or in other parts of this document. The inventor does not waive or disclaim his rights to any invention or inventions disclosed in this specification merely by not describing such other invention or inventions in the claims.

The present invention is based on the realization that where fuel cell stacks or fuel cell power modules are provided together, it may be desirable to provide common elements for the plurality of fuel cell stacks or fuel cell power modules as the case may be. In particular, it may be desirable to provide common venting arrangements to deal with any possible hydrogen leaks.

In accordance with one aspect of the present invention, there is provided system, comprising: a ventilation enclosure having a front side, a rear side, and a frame generally between the front and rear sides; a plurality of power modules received in vertical arrangement within the frame, each of the power modules comprising an external casing, a fuel cell stack housed within the external casing, a fuel inlet for supplying fuel to the fuel cell stack and at least one exhaust outlet for discharging exhaust gases from the power module, the fuel inlet and the exhaust outlet being accessible through the external casing at a rear of the power module; a ventilation shaft arranged along the rear side of the ventilation enclosure and comprising a plurality of connection apertures, each of the connection apertures being adapted to sealingly receive the rear of a respective power module so that the exhaust outlet of the respective power module discharges into the ventilation shaft; a fuel supply pipe extending into the ventilation shaft, and arranged to supply fuel to the fuel inlets of the power modules; and an exhaust pump connected to the ventilation shaft and arranged to draw exhaust fluid out of the ventilation shaft, wherein each of the power modules is removably attachable to the ventilation shaft through the front side of the ventilation enclosure, and with the respective unoccupied connection aperture of the ventilation shaft being sealable to prevent air ingress into the ventilation shaft when the is not present.

In accordance with another aspect of the present invention, there is provided a power module, comprising: an external casing; a fuel cell stack housed in the external casing; a vent opening to provide air ingress into the external casing for supply of air to the fuel cell stack; a collar extending from the external casing for sealably connecting with a ventilation shaft; a fuel inlet for supplying fuel to the fuel cell stack, the fuel inlet being accessible through the collar so that fuel is supplied to the fuel cell stack throwgh the ventilation shaft; and at least one exhaust outlet for discharging exhaust gases from the power module, the exhaust outlet being directed through the collar so that the exhaust gases discharge into the ventilation shaft.

In accordance with another aspect of the present invention, there is provided a method, comprising: providing a plurality of power modules, each of the power modules comprising an external casing, a fuel cell stack housed within the external casing, a fuel inlet for supplying fuel to the fuel cell stack, and at least one exhaust outlet for discharging exhaust gases from the power module; mounting the power modules onto a frame; connecting the power modules to a ventilation shaft, so that, for each of the power modules, the fuel inlet is accessible through the ventilation shaft, and the exhaust outlet is directed into the ventilation shaft; supplying fuel through the ventilation shaft to the fuel inlets of the power modules; and discharging exhaust gases from the exhaust outlets of the power modules into the ventilation shaft.

BRIEF DESCRIPTION OF THE DRAWING FIGURES

For a better understanding of the present invention and to show more clearly how it may be carried into effect, reference will now be made, by way of example, to the accompanying drawings in which.

DETAILED DESCRIPTION

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. It is possible that an apparatus or method described below is not an embodiment of any claimed invention. The applicants, inventors and owners reserve all rights in any invention disclosed in an apparatus or method described below that is not claimed in this document and do not abandon, disclaim or dedicate to the public any such invention by its disclosure in this document.

Figure 1:
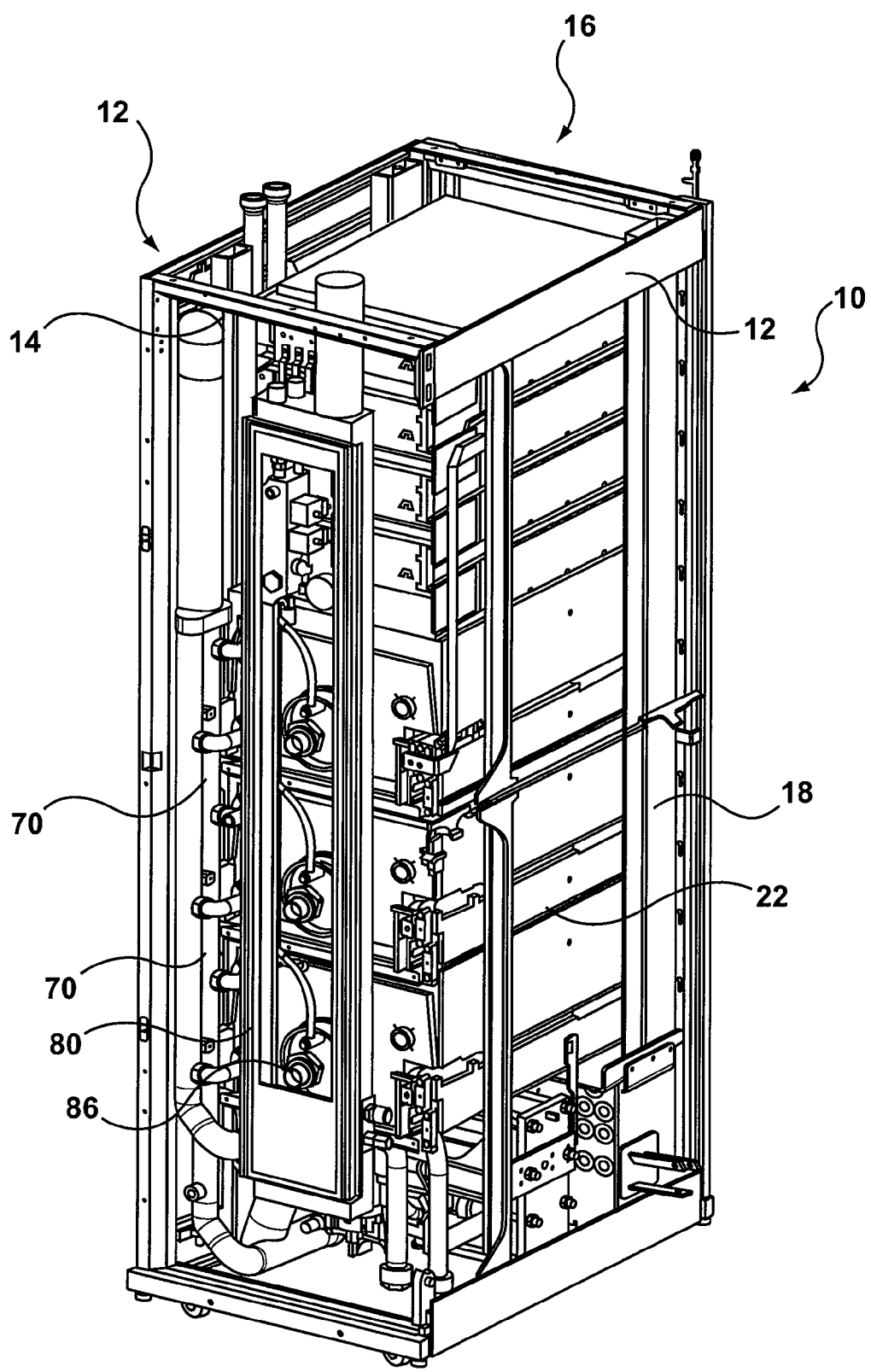
FIG. 1 is a perspective view from the rear of a ventilation enclosure for fuel cell power modules showing a ventilation shaft partially open.
Figure 2:
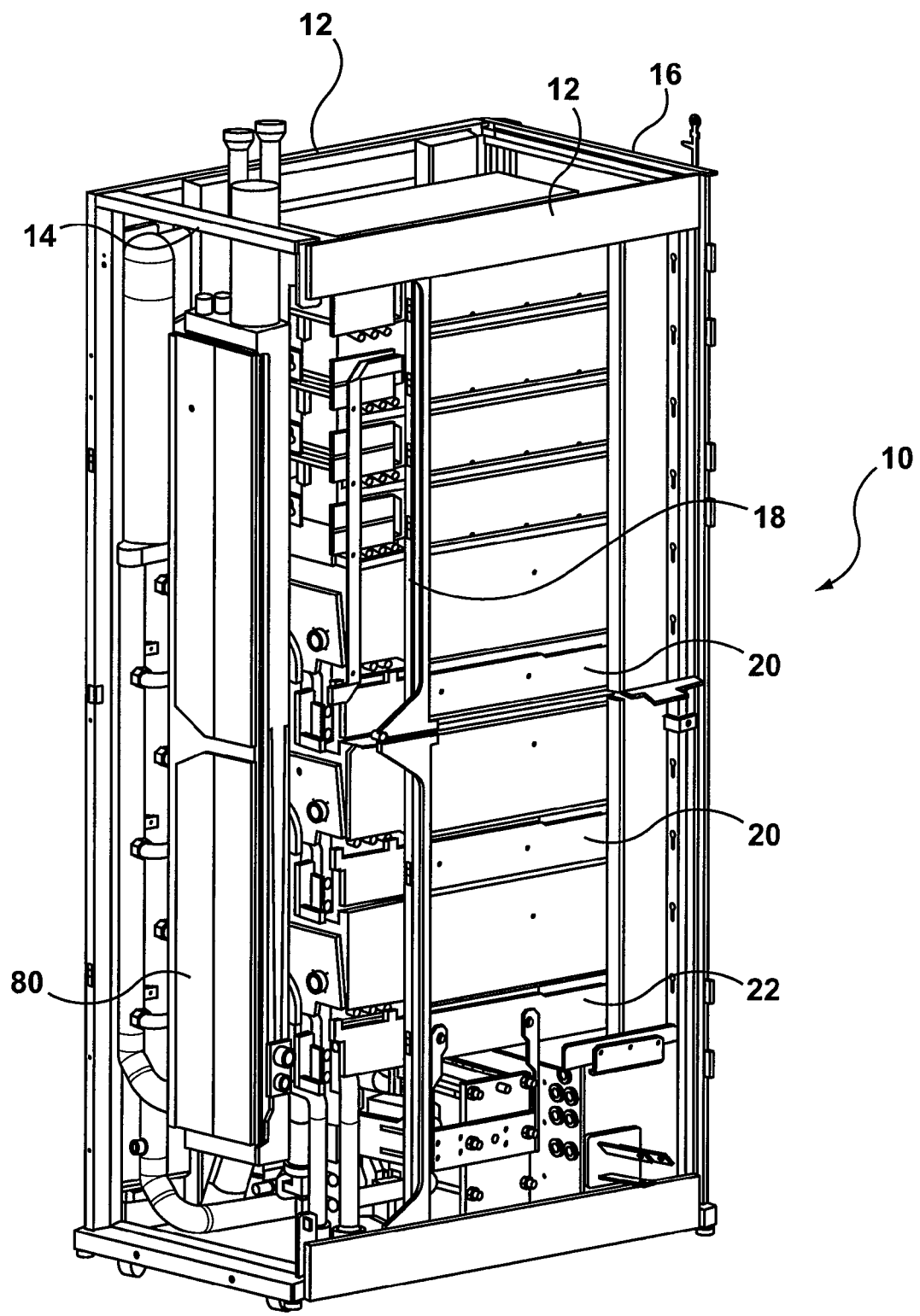
FIG. 2 is a perspective view from the rear of the ventilation enclosure of FIG. 1 showing a closed ventilation shaft.
Figure 3:
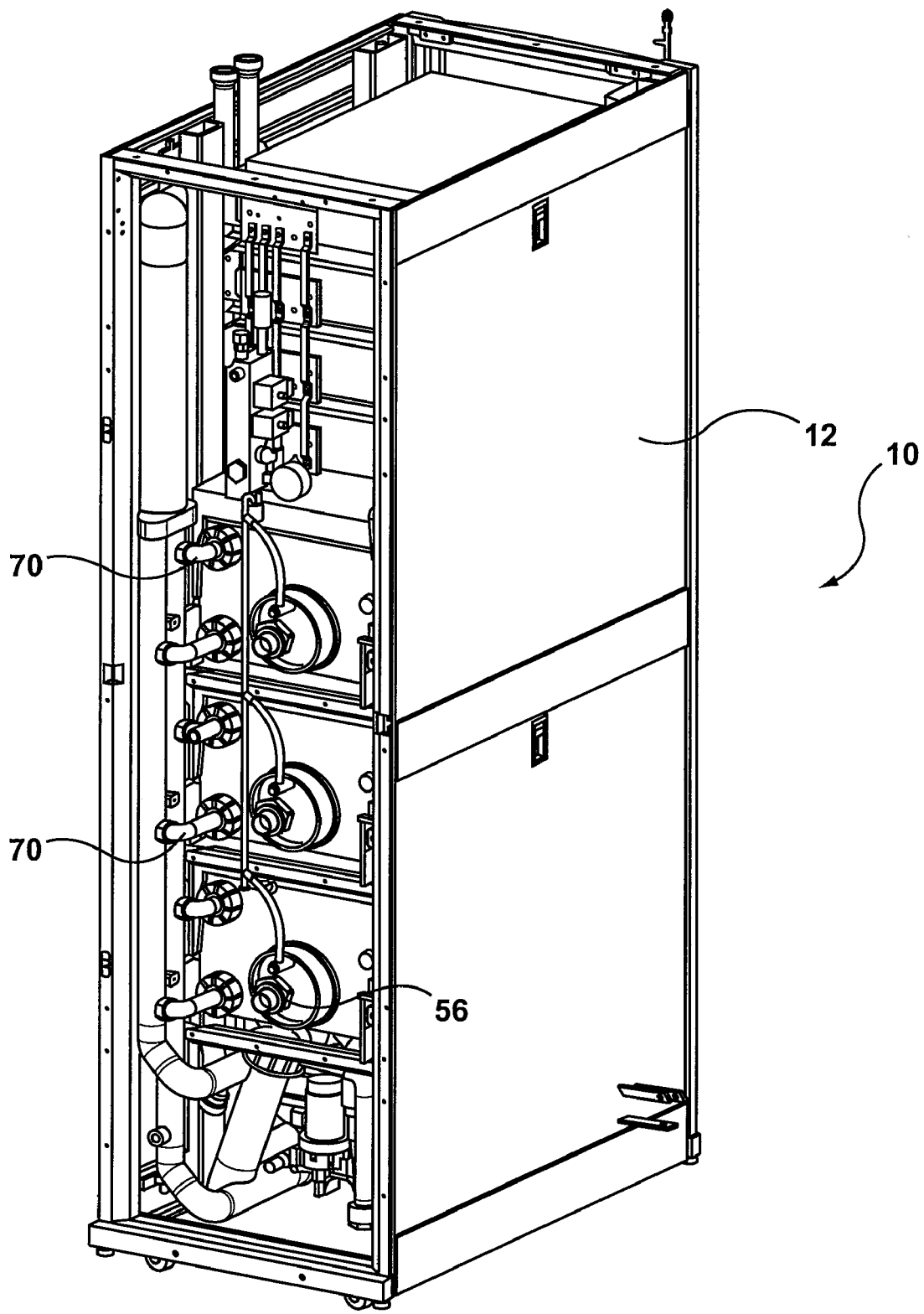
FIG. 3 is another perspective view from the rear of the ventilation enclosure, with the ventilation shaft.

Referring to FIGS. 1, 2 and 3, there is shown a ventilation enclosure 10 in a view from the rear. The ventilation enclosure 10 has sides 12, a rear 14 and a front 16 (not fully shown in the drawings). It provides a frame generally indicated at 18 that provides racks 20. Each rack comprises a pair of rack rails 22 into which a power module can be slid.

Power modules in the ventilation enclosure 10 can be intended to provide a backup power supply. For this purpose, connections need to be provided for process fluids for the power modules, for example, hydrogen gas, liquid coolant, as well as electrical power etc. In this embodiment, the power modules are based on fuel cell stacks that utilize air as the oxidant, so that no separate inlet need be provided for the air as a reactant gas, although other oxidants may be used.

Figure 4:
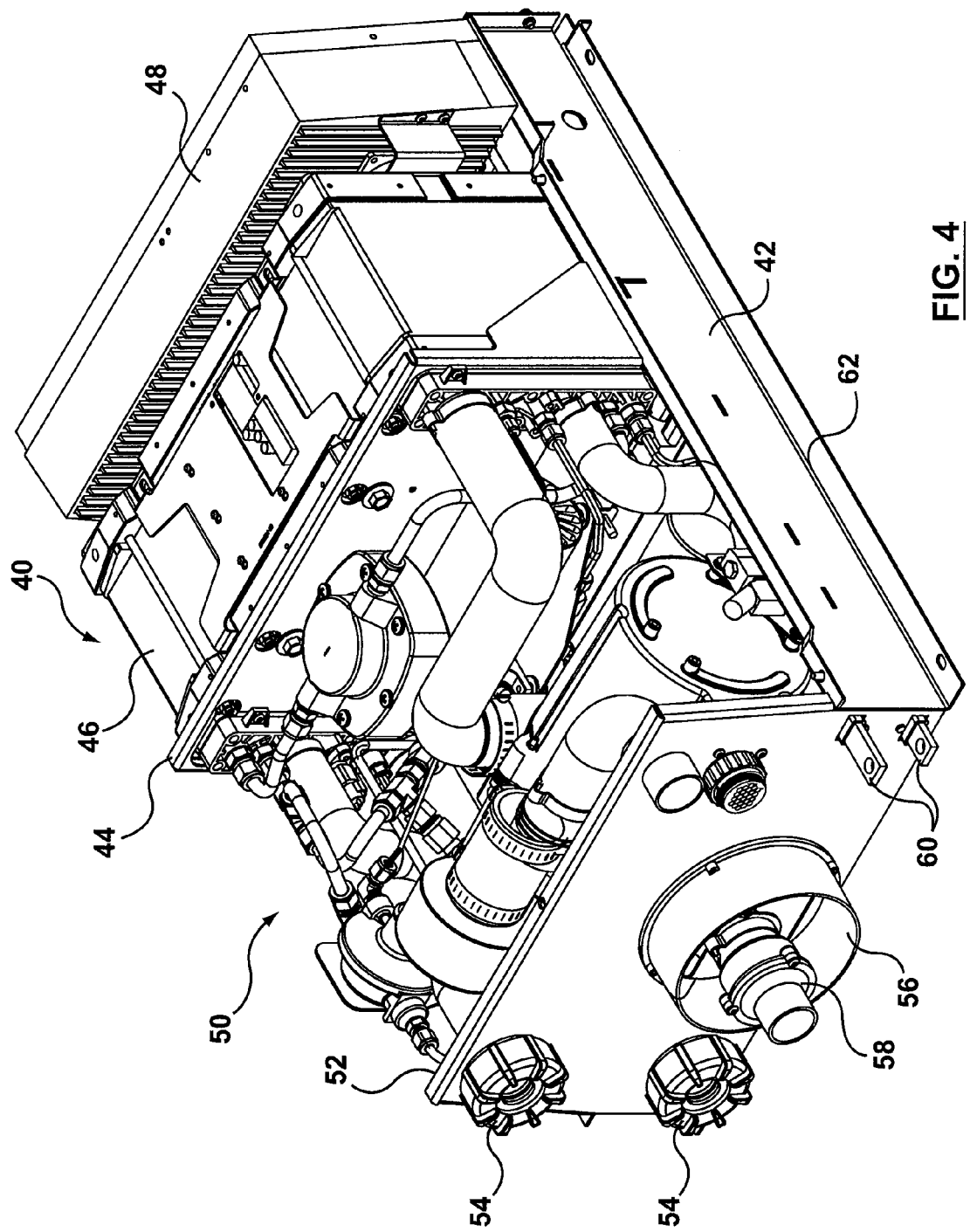
FIG. 4 is a perspective view from rear of a single power module for mounting in the ventilation enclosure.

An exemplary power module is shown at 40 in FIG. 4, and further variants of a power module configuration are detailed in application Ser. No. 11/876,425 filed Oct. 22, 2007, hereby incorporated herein by reference in its entirety. Here, it is noted that the power module 40 has a frame 42 with a central flange 44 to which is mounted a fuel cell stack 46. Electronic control equipment 48 is mounted towards the front of the power module 40, so as in use to be at the front of the ventilation enclosure 10 and readily accessible for maintenance. Back towards the rear of the power module 40, there is generally indicated other balance of plant components 50, e.g., valves, pumps, etc.

At the rear of the power module 40 there is a rear flange 52 of the frame 42. On this rear flange 52, as seen in FIG. 4, there are two connection sockets 54 (detailed further in Application No. 60/981,692 filed Oct. 22, 2007, hereby incorporated herein by reference in its entirety. These connection sockets 54 provide for connections to a coolant supply, e.g., deionized water.

In the rear flange 52, there is an extension or circular collar 56; in this embodiment, it is located centrally, but this is not essential. Extension 56 is sealed with an annular seal 86 as described below. The extension 56 and seal 86 provides for a main vent from the power module 40. Passing through the extension 56 is a hydrogen or fuel inlet 58.

On the right hand side of the rear flange 52 (again as viewed in FIG. 4), there are connections 60 for electrical power generated by the power module.

The frame 42 of each power module 40 includes side rails 62 that are dimensioned for a sliding fit with the rack rails 22 of the ventilation enclosure 10. In use, the power modules 40 are slid into the ventilation enclosure 10 on the rails 22, and the connection sockets 54 then make connections with conduits 70 for a coolant supply (e.g., water). The connectors 60 simultaneously make connection with electrical supply leads or bus bars.

Figure 5:
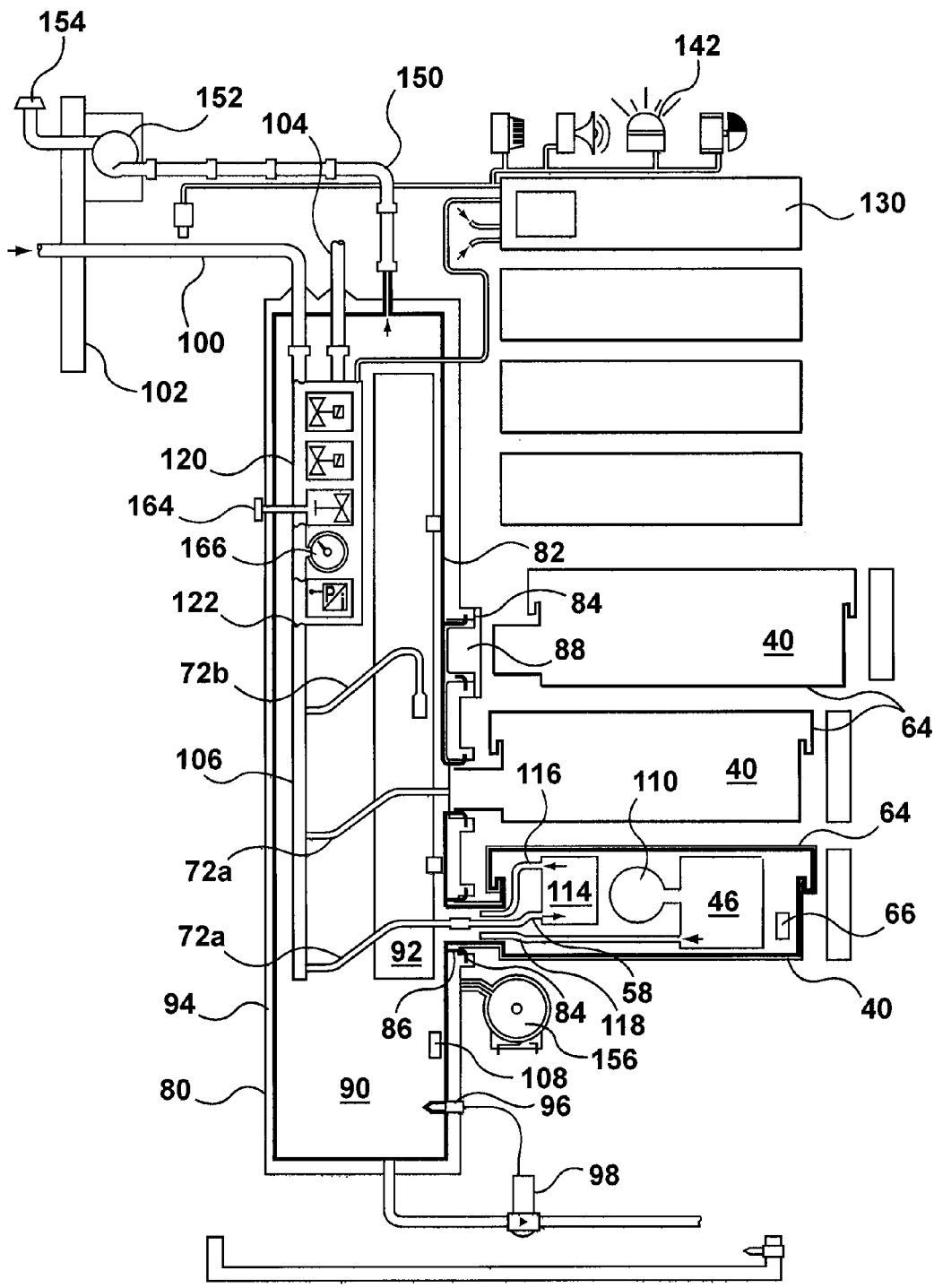
FIG. 5 is a schematic elevational view of components of the ventilation enclosure of FIGS. 1 and 2.

Additionally, as shown in FIG. 5, individual connection lines 72 for a hydrogen supply are connected to the hydrogen fuel inlets 58.

The ventilation enclosure 10 including the power modules 40 will usually, but not necessarily, be placed in an indoor and non-residential environment. For such a location, there is the need to make a system safe. In particular, it will usually be necessary to ensure that any hydrogen leaks do not give rise to potentially dangerous situations, e.g., formation of explosive or flammable mixtures of hydrogen and air.

The present invention is based on the concept of a boundary of dilution. All sources of potential hydrogen leakage are placed within the boundary of dilution, and this in turn is provided with a gas tight construction. Forced ventilation is then used to ventilate the boundary of dilution to safe hydrogen concentrations during all foreseeable events.

Additionally, ventilation is interlocked with hydrogen and control valves to ensure that there is no possibility of an ignition source igniting leaked hydrogen. This means that if there is no ventilation within the boundary of dilution, then hydrogen supply to the power modules is closed off and potential ignition sources are de-energized. All components that may be exposed to hydrogen within the dilution boundary are designed to eliminate ignition sources, e.g., by the use of brushless motors. The ventilation interlock is implemented by means of a pressure switch. If there is some interruption in the supply of ventilation or the boundary of dilution, then this area may be ventilated with five volume changes, to ensure venting and discharge of any hydrogen present, before electrical components within the boundary are re-energized.

Each fuel cell power module is designed to keep residual hydrogen contained inside the boundary of dilution.

Referring to FIG. 5, this shows greater detail of the ventilation enclosure. In FIG. 5, individual power modules are again indicated at 40. Each power module 40 includes an external casing 64, part of which can comprise, for example, the rear flange 52 and the side rails 62. The external casing 64 is entirely closed and sealed, except at the rear where the extension 56 provides an opening to a ventilation shaft (FIGS. 1, 3 and 5) and except for the provision of a vent opening 66. The vent opening 66 may be provided at the front of each power module 40, i.e., opposite the extension 56, so as to establish a flow of air through the power module 40, as detailed below, to flush out any leaking hydrogen.

The ventilation enclosure then includes a ventilation shaft 80, that is a generally rectangular parallelepiped; it will be understood that the exact profile and shape of the ventilation shaft does not impact its function, and it could, for example, be cylindrical or elliptical in shape. As shown in FIG. 1, one, front side of the shaft 80 is arranged to provide connections to the individual power modules 60. For this purpose, a front side 82 of the shaft 80 includes connection apertures 84 provided with annular seals 86. As shown in FIG. 5, the extensions 56 of the individual power modules 40 then engage these seals 86 to form a sealing connection.

Where a power module 40 is not present, a plug 88 can be used to close off each unoccupied connection aperture 84.

As shown in FIG. 5, a side panel 90 of the ventilation shaft 80 can be provided with an access opening 92, that is normally closed and sealed in use.

A rear panel 94 of the ventilation shaft 80 (shown in FIG. 2) can be removable (as shown in FIG. 1), or connected by a hinge to the ventilation enclosure, to provide access to the connections to the individual power modules 40, to enable these connections to be perfected.

Turning to details of the hydrogen supply, as indicated in FIG. 5, a main hydrogen supply pipe 100 may be connected to a supply of hydrogen provided externally of a boundary wall 102, or otherwise located in a remote location for safety purposes. The hydrogen supply pipe 100 extends into the ventilation shaft 80 and is connected to a valve assembly 120 detailed below. The hydrogen supply pipe 100 may also connected to a hydrogen feed forward pipe 104, that can be connected to other ventilation enclosures 10 with their respective power modules 40, where it is required to have a number of power modules in operation or available for operation.

The valve assembly 120 has an outlet 122 connected to a distribution pipe 106, that in turn is connected to the individual connection lines 72. As shown in FIG. 5, two connection lines 72a are shown connected to respective power modules 40, while a third connection line 72b is shown not connected with no power module present.

At the bottom of the ventilation shaft 80, there is provided a water level sensor 96 connected to a valve or pump 98, that in turn is connected to the bottom of the vertical shaft 80. In response to a sensed level of condensate collecting at the bottom of the ventilation shaft 80, the valve or pump 98 is actuated to discharge this from the shaft 80.

A controller 130 is provided connected to the valve assembly 120 in known manner, the controller can also be connected to a variety of acoustic or visible warning devices generally indicated at 142.

To vent the ventilation shaft 80, there is provided an exhaust conduit 150 connected to an exhaust pump or fan 152 which in turn passes through the boundary wall 102 to an exterior vent 154. A pressure switch 156 is connected to the ventilation shaft 80, with both the pressure switch 156 and pump or fan 152 being connected to and controlled by the controller 130.

Referring to FIG. 5, within each power module 40, there can be provided a blower 110 for supply of air as the cathode reactant, connected to the fuel cell stack again indicated at 46. There is also shown schematically in FIG. 5 a fuel module 114 having a connection to the hydrogen fuel inlet 58 and an exhaust 116 for exhausted hydrogen. This fuel module 114, in known manner, would provide functions such as humidification of fuel, recirculation of fuel, and would be connected to the fuel cell stack 46.

An exhaust for spent cathode gas is also provided at 118. The two exhaust outlets 116, 118 are directed through the extension 56 of the power module 40, so as to discharge into the ventilation shaft 80. A check valve may be arranged on the cathode exhaust to prevent any flow through the cell stack when the fuel cell is not in operation.

In normal use, the fuel cell stacks 46 may operate with a continuous through-flow of air as the cathode gas. For the fuel, this may be re-circulated, and may be purged on a periodic basis as required, with purging typically being carried out to prevent accumulation of contaminant gases and the like in the fuel cell stack 46.

Figure 7:
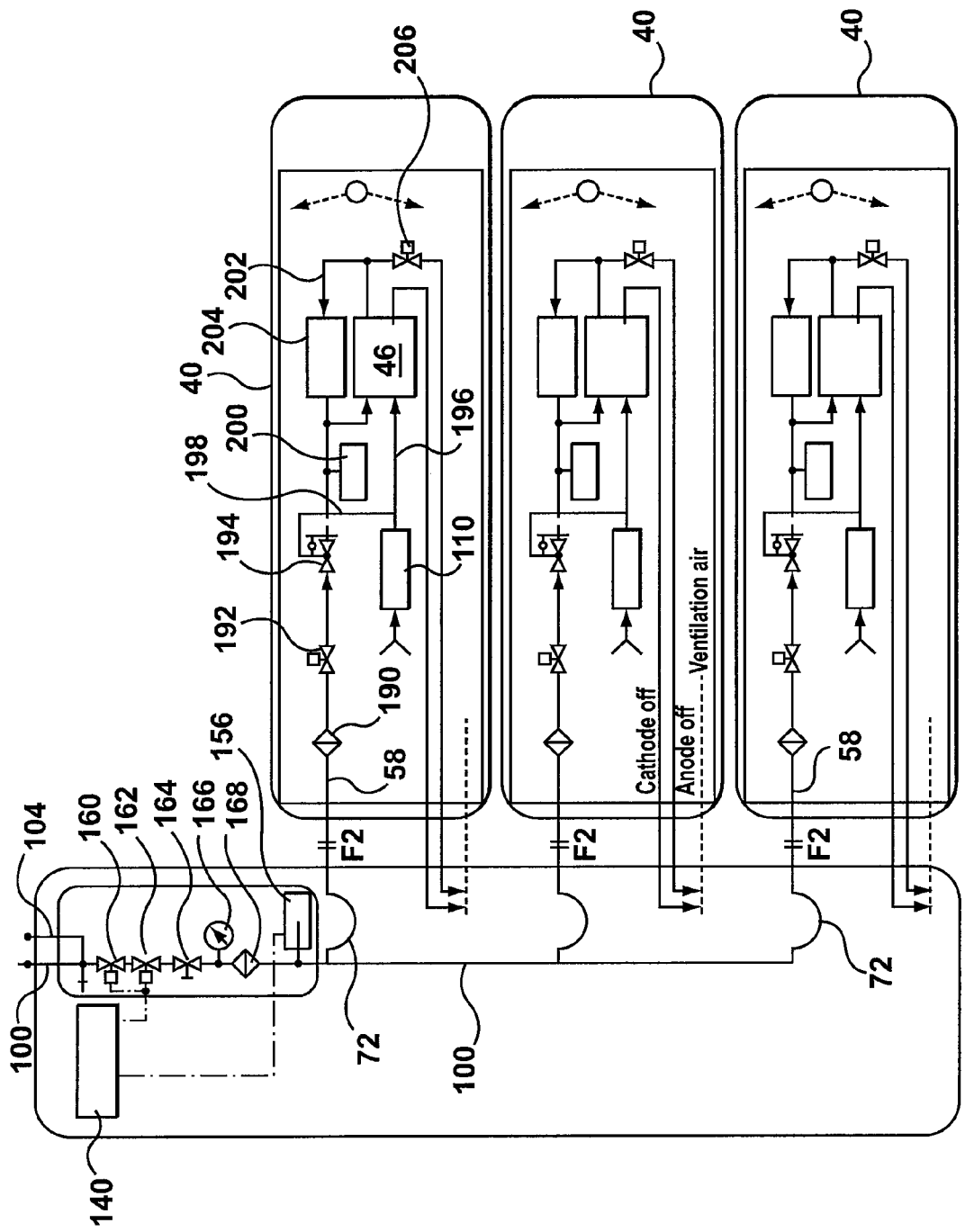
FIG. 7 is a diagram indicating connections within the ventilation enclosure.

Turning to FIG. 7, there is shown details of the valve assembly 120. The hydrogen supply 100 and the hydrogen feed forward line 104 are connected to valves 160 and 162, that in turn are connected to the controller 140. Downstream from these valves 160, 162, a manual control valve 164, as indicated in FIG. 5, may be arranged for operation from the exterior. A pressure indicator may be provided at 166 and a connection or filter provided at 168.

A pressure measuring switch 156 is shown as part of the valve assembly 120 and is connected to the controller 140.

Figure 6:
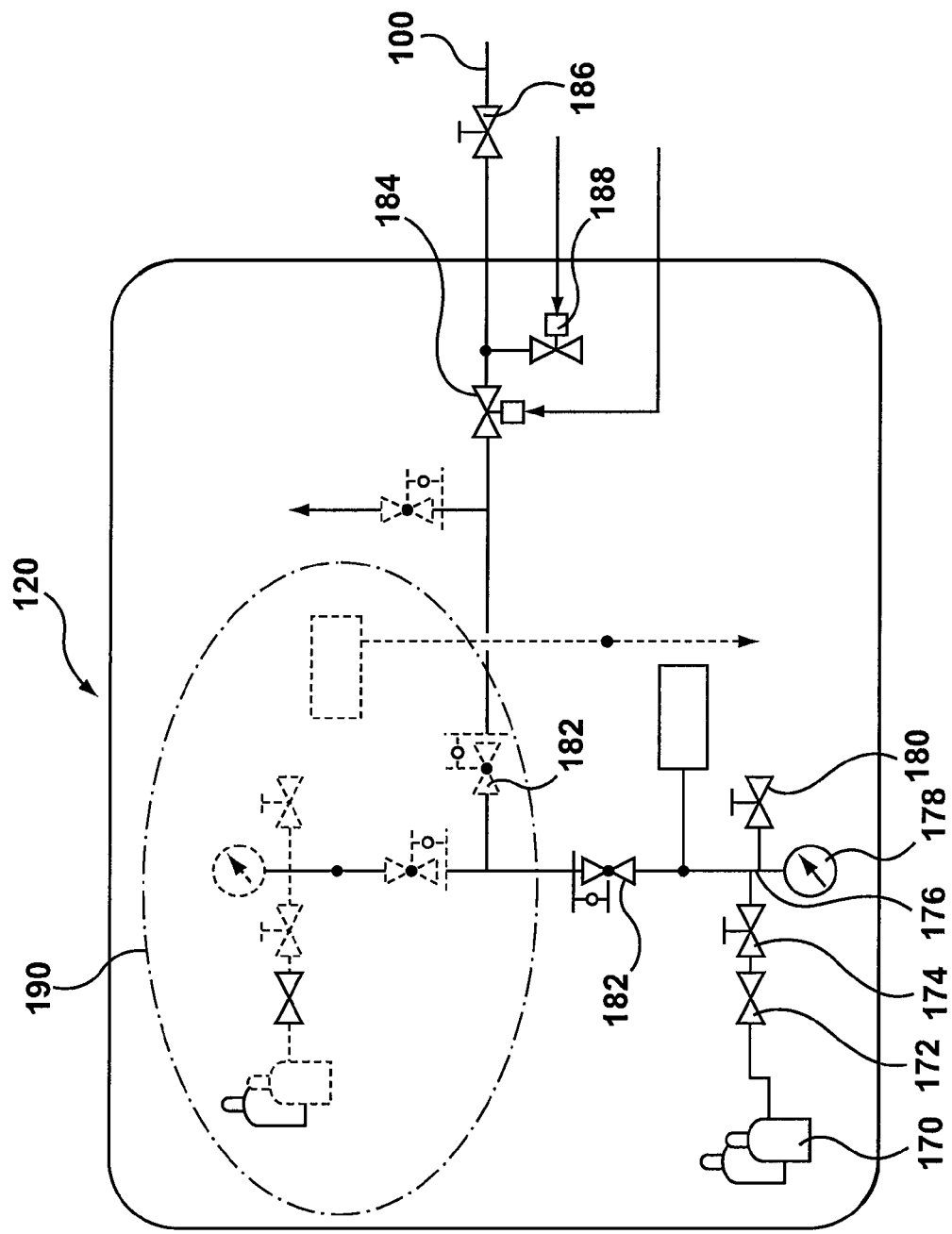
FIG. 6 is a diagram of a fuel storage assembly.

Turning to FIG. 6, there is shown a fuel storage arrangement. One or more fuel storage containers or vessels 170 may be connected through a pressure reducing valve 172 to a manual control valve 174, then to a connection point 176. This connection point 176 may be connected to a pressure indicator or gauge 178 and also to a further manual valve 180 that enables venting to be provided.

From the connection point 176, the line is connected through at least one further pressure reducing valve 182 and then to a solenoid valve 184 that provides connection to a further manual control valve 186, and from there the fuel is connected to the hydrogen supply line 100. A purge test valve is provided at 188.

As indicated at 190, additional and corresponding valving and other components can be provided to enable a hot swap option, i.e., to enable a new supply of hydrogen to be switched in and connected before a first supply vessel 170 is exhausted.

Referring to FIG. 5, the ventilation shaft 80 includes an additional vent opening 108 at the bottom thereof, that can also serve as an overflow for accumulated condensate. In use, the pump or blower 152 is operated so as to draw air from the interior of the ventilation shaft 80 and discharge it through the exterior vent 154. Due to the presence of the vent opening 108 at the bottom of the shaft 80 and the individual vent openings 66 of each of the power modules 40, ambient air will be drawn in through these openings, through the power modules 40 and up through the ventilation shaft 80. Exhausted anode and cathode, i.e., hydrogen and air, from the power modules 40 is discharged through to the exhausts 116, 118 into the interior of the ventilation shaft 80. With sufficient airflow, this is diluted below limits of combustion or flammability, and the diluted mixture is then vented out through the vent 154. The pressure sensor 156 may be monitored by the controller 140 to ensure that a pressure within the ventilation shaft 80 is maintained below atmospheric pressure by a pre-set amount, this being indicative of adequate flow of air out of the ventilation shaft 80 to the exterior.

In use, various leakages can occur. Any "abnormal unlimited release" can occur where a component malfunction causes a leakage. During an abnormal unlimited release event ventilation should be adequate to dilute the hydrogen mixture to below 50% LEL (Lower Explosion Limit). For "a normal mode release" this being for somewhat slow leakages and diffusion that will always be present, the ventilation should dilute the mixture to below 25% LEL.

In normal usage, a fuel cell power module may have two anode purge levels. During normal mode operation the fuel cell may purge on a regular basis, for example, by way of 40 lpm pulse for three seconds repeated every two minutes, to give a two lpm discharge on average.

Additionally, when a fuel stack is performing badly, the fuel cell control system can enter a "hard recovery mode" to restore the fuel cell to proper operation. In this hard recovery mode, the purge solenoid valve may be kept open until the stack has recovered. This is considered an abnormal event and covered by the "abnormal and limited release".

With reference to FIG. 7, there is shown details of some of the flow connections within each power module 40. Thus, each power module 40 has a respective connection line 72 its respective hydrogen fuel inlet 58. Internally within each power module 40, there is a filter 190 that is connected to a solenoid valve 192, that is in turn connected to a forward pressure regulating valve 194. The cathode blower or fan 110 is shown connected by a line 196 to the actual fuel cell stack 46. A connection 198 from the cathode gas supply line 196 to the valve 194 serves to control the pressure in the hydrogen line and depends upon the pressure of the cathode supply line. The hydrogen supply line can be biased to be either slightly above or below the pressure in the cathode line 196. A pressure sensor may be provided at 200 and is connected to a respective control unit for each power module 40.

Internally within each power module 40, there is a filter 190 that is connected to a solenoid valve 192, that is in turn connected to a forward pressure regulating valve 194. The cathode blower or fan 110 is shown connected by a line 196 to the actual fuel cell stack 46. A connection 198 from the cathode gas supply line 196 to the valve 194 serves to control the pressure in the hydrogen line and depends upon the pressure of the cathode supply line. The hydrogen supply line can be biased to be either slightly above or below the pressure in the cathode line 196. A pressure sensor may be provided at 200 and is connected to a respective control unit for each power module 40.

The stack 46 is provided with a recirculation line 202 that is connected through an anode or hydrogen recirculation pump to an anode inlet of the stack 406. The exhaust lines 116, 118 for the cathode and anode, respectively, are shown for each power module and are discharged to a mixing point to within the ventilation shaft 80. A control valve 206 is provided on the anode exhaust, so that the anode exhaust may be opened and anode purging take place in a controlled manner as desired.

As shown, the vent opening 66 in the power modules 40 permit ventilation air to be drawn into the power modules and then to flow through them towards the shaft 80. The arrows then indicate that the air flows into the shaft 80 and is drawn upwards.

It will be understood that various modifications and variants are encompassed by the invention, in addition to the detailed embodiment described. For example, while each power module has been described as being largely self-contained, for reasons of economy, simplicity and even reliability, it may be preferable to provide some common balance of plant elements. For example, rather than providing a single blower in each power module, it may be preferable to provide a bank of blowers, for the cathode air supply, together and in parallel, so that if any one blower fails, the others will still be operational and capable of supplying air to all the active power modules. Other elements, e.g. a common filter for incoming air can be provided for the power modules. Aspects of the hydrant circuits in each power module and control systems may also be provided on a common basis and separate from any one power module.

Additionally, while the described embodiment envisages that each power module 40 would have its own casing that provides a completely sealed containment of the components of the power module, other variants are possible.

The invention claimed is:

1. A system, comprising:
a ventilation enclosure having a front side, a rear side, and a frame generally between the front and rear sides;
a plurality of power modules received within the frame, each of the power modules comprising an external casing, a fuel cell stack housed within the external casing, a fuel inlet for supplying fuel to the fuel cell stack, and at least one exhaust outlet for discharging exhaust gases from the power module, the fuel inlet and the exhaust outlet being accessible through the external casing at a rear of the power module;
a ventilation shaft arranged along the rear side of the ventilation enclosure and comprising a plurality of connection apertures, each of the connection apertures being adapted to sealingly receive the rear of a respective power module so that the exhaust outlet of the respective power module discharges into the ventilation shaft;
a fuel supply pipe extending into the ventilation shaft, and arranged to supply fuel to the fuel inlets of the power modules; and
an exhaust pump connected to the ventilation shaft and arranged to draw exhaust fluid out of the ventilation shaft,
wherein each of the power modules is removably attachable to the ventilation shaft through the front side of the ventilation enclosure, and with the respective unoccupied connection aperture of the ventilation shaft being sealable to prevent air ingress into the ventilation shaft when the power module is not present.

2. The system of claim 1, wherein the frame comprises a plurality of rack rails, and each of the power modules comprises side rails that are dimensioned for sliding fit with the rack rails of the frame.

3. The system of claim 2, wherein, for each of the power modules, the external casing comprises a collar extending beyond the rear of the power module, and the connection apertures each comprise an annular seal adapted to engage the respective collar to form a sealing connection.

4. The system of claim 3, wherein, for each of the power modules, the external casing comprises a vent opening at a front of the power module to provide air ingress into the external casing.

5. The system of claim 4, wherein the ventilation shaft comprises a vent opening at a bottom thereof to provide air ingress into the ventilation shaft.

6. The system of claim 5, wherein the fuel supply pipe comprises a shut-off valve arranged to selectively enable and disable flow of fuel to the power modules, and the ventilation shaft encompasses the fuel supply pipe at least up to and including the shut-off valve.

7. The system of claim 1, further comprising a controller for monitoring system operation, the controller being arranged outside of the ventilation shaft and the external casings of the power modules.

8. The system of claim 7, further comprising a valve assembly arranged in the ventilation shaft and connected to the fuel supply pipe, the controller being configured to operate the valve assembly to distribute fuel from the fuel supply pipe to the fuel inlets of the power modules.

9. The system of claim 8, further comprising a pressure sensor arranged in the ventilation shaft to communicate a pressure signal to the controller.

10. The system of claim 9, wherein the controller is configured to regulate the exhaust pump to maintain a pressure differential between the ventilation shaft and ambient atmosphere.

11. The system of claim 1, wherein each of the power modules comprises connection sockets at the rear of the external casing for connection to a coolant supply.

12. The system of claim 11, wherein each of the power modules comprises connections at the rear of the external casing for distributing electrical power.

13. The system of claim 1, wherein the system is arranged in a building and the exhaust pump is arranged to discharge air through an exterior vent to outside of the building.

14. A power module, comprising:
an external casing;
a fuel cell stack housed in the external casing;
a vent opening to provide air ingress into the external casing for supply of air to the fuel cell stack;

a collar extending from the external casing for sealably connecting with a ventilation shaft;

a fuel inlet for supplying fuel to the fuel cell stack, the fuel inlet being accessible through the collar so that fuel is supplied to the fuel cell stack through the ventilation shaft; and at least one exhaust outlet for discharging exhaust gases from the power module, the exhaust outlet being directed through the collar so that the exhaust gases discharge into the ventilation shaft.

15. A method, comprising:

providing a plurality of power modules, each of the power modules comprising an external casing, a fuel cell stack housed within the external casing, a fuel inlet for supplying fuel to the fuel cell stack, and at least one exhaust outlet for discharging exhaust gases from the power module;

mounting the power modules onto a frame;

providing sealed main vents connecting the power modules to a ventilation shaft, so that, for each of the power modules, the fuel inlet is accessible through the ventilation shaft and the main vent, and the exhaust outlet is in communication with the ventilation shaft through the main vent;

supplying fuel through the ventilation shaft to the fuel inlets of the power modules; and discharging exhaust gases from the exhaust outlets of the power modules into the ventilation shaft.

16. The method of claim 15, further comprising drawing exhaust fluid out of the ventilation shaft.

17. The method of claim 16, further comprising venting the ventilation shaft to provide air ingress to the ventilation shaft.

18. The method of claim 16, further comprising monitoring a pressure in the ventilation shaft, and maintaining a pressure differential between the ventilation shaft and ambient atmosphere.

* * * * *